June 12, 1934.　　　F. W. LAUX　　　1,962,991
HUMIDIFIER VALVE
Filed Dec. 1, 1930

Inventor
FRANK W. LAUX
By Frank Keifer
Attorney

Patented June 12, 1934

1,962,991

UNITED STATES PATENT OFFICE 1,962,991

HUMIDIFIER VALVE

Frank W. Laux, Rochester, N. Y.

Application December 1, 1930, Serial No. 499,167

5 Claims. (Cl. 137—104)

The object of this invention is to provide a regulating device that will keep the water in the pan of a hot air furnace at a level that is substantially constant.

Another object of the invention is to provide a slide valve that is guided by a tubular socket with which it makes a substantially close sliding fit.

Another object of the invention is to provide the slide valve with a duct leading to it substantially in line with the axis of the valve and a duct leading from it substantially at right angles to the axis of the valve.

These and other objects of the invention will be illustrated in the drawing described in the specification and pointed out in the claims at the end thereof.

In the drawing Figure 1 is a perspective view of the assembly of the tank with the valve of my invention.

In the drawing like reference numerals indicate like parts.

Figure 1:
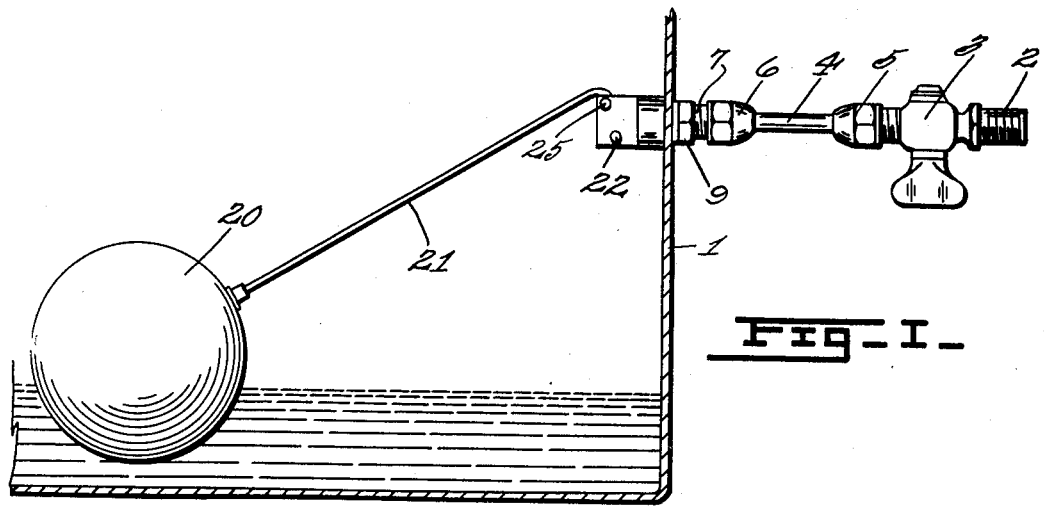
Figure 3:
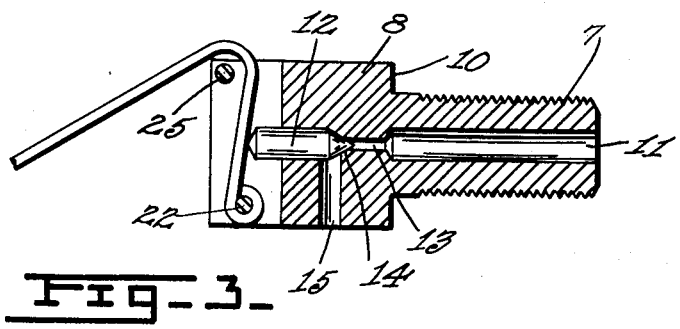
Figure 3 is a section on the line $3x$—$3x$ of Figure 2.
Figure 2:
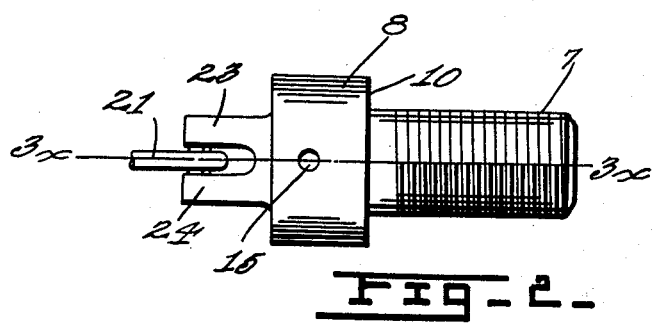
Figure 2 is a bottom plan view of the valve shown in Figure 1.

In the drawing reference numeral 1 indicates the water tank of the hot air furnace. 2 indicates a pipe connected to the water supply of the house. 3 indicates a valve for shutting off the water. 4 indicates a small flexible copper pipe or tube, which is connected at one end by the coupling 5 with the water supply and at the other end it is connected by a coupling 6 with a nipple 7 to the valve housing 8. The valve housing 8 has a threaded nipple 7 which extends through an opening in the tank 1. The valve housing is clamped in the tank by the nut 9 which draws the shoulder 10 of the housing up against the opposite side of the wall of the tank.

In the nipple is an opening or duct, 11, which extends in line with the axis of the slide valve 12, which moves in a chamber that makes a close sliding fit with the valve. The opening 11 is contracted as indicated at 13 and terminates in a cone shaped valve seat 14, that fits with the cone shaped end of the valve 12.

At right angles to the axis of the valve 12 is the passage way or duct 15, which extends through the housing and is pointed down into the tank. When the valve 12 moves to open the passage the water flows past the end of the valve and into the duct 15, and down into the tank.

A float 20 is provided on an arm 21, which swings on a pivot 22. The pivot 22 is carried between the bifurcated ends 23 and 24 which are integral with the valve housing. A pin 25 is provided which limits the downward swing of the arm 21 and the upward swing of the arm is limited by its contact with the valve 12, it being obvious that the forward movement of the valve 12 is limited by its seat.

When the water in the pan 1 falls, the float 20 drops and carries the arm 21 down with it and this releases the valve 12 which is forced off its seat by the pressure of the water in the duct 11. The water then flows past the cone shaped end of the valve and through the duct 15 into the pan 1. As the level of the water rises in the pan 1, the float 20 rises and closes the valve 12 on its seat and shuts off the flow of water into the pan 1.

I claim:

1. In a feed regulating device consisting of four parts, the combination of a valve housing having a threaded nipple and a shoulder thereon, said housing being adapted to be clamped in the side of a water pan with the nipple extending through a hole in the pan to the outside thereof, a small cylindrical valve chamber having a cone-shaped valve seat at one end thereof, a valve head having a small cylindrical body and a cone-shaped end adapted to engage with said valve seat with a sliding fit, said valve head and valve seat being located in the shouldered part, a duct leading through said nipple to said valve, said duct being substantially in line with the axis of the valve, a duct leading from the valve chamber down to the water pan, said duct being substantially at right angles to the axis of the valve head, the two ducts being separated only by the length of said valve seat, the movement of said valve away from its seat being adapted to connect the one duct with the other, said valve housing at the rear end having a vertical slot therein in which the cylindrical body of the valve head is exposed, a bent float arm, a pivot in said slot on which said arm is mounted to swing therein and engage the end of said cylindrical head with the bent portion of the arm.

2. A feed regulating valve comprising four parts and having a valve housing having two ducts therein, said ducts being placed substantially at right angles to each other and intersecting with each other, a valve seat at the secting point of intersection, the two ducts being separated only by the length of said valve seat, a valve head having a small cylindrical body and having its axis substantially in line with one of said ducts and being adapted to move to and from said valve seat with a sliding fit to open a connection between said ducts, a small cylindrical valve chamber in which said valve head moves, said valve housing at the rear end having a vertical slot therein in which the cylindrical body of the valve head is exposed, a bent float arm, a pivot in said slot on which said arm is mounted to swing therein and engage the end of said cylindrical head with the bent portion of the arm.

3. In a feed regulating device consisting of five parts, the combination of a fitting having a reduced threaded nipple on one end and an enlarged shoulder on the other end thereof, a duct and valve seat and chamber extending through said device and a cylindrical valve head sliding therein, said fitting having a forked end thereon, a pin extending through the forks, a bent arm pivoted thereon and extending upward across the line of the valve head and valve seat and then downwardly and rearwardly, a float on the end of said arm, said arm being adapted to move the valve head forward against its seat as the float rises, and release the valve head as the float falls, a small cylindrical valve chamber between the valve seat and said arm in which said valve head moves.

4. A regulating valve comprising five parts and having a valve housing having two ducts therein, said ducts being placed substantially at right angles to each other and intersecting with each other, a valve seat at the point of intersection, the two ducts being separated only by the length of said valve seat, a valve head having a cylindrical body and having its axis substantially in line with one of said ducts and being adapted to move to and from said valve seat with a sliding fit to open a connection between said ducts, said valve housing at the rear end having a vertical slot therein in which the cylindrical body of the valve head is exposed, a float, a bent arm for said float, a pivot in said slot on which the float arm is pivoted, said arm making contact with said valve head and closing it on its seat on the rise of said float, a small cylindrical valve chamber between the valve seat and said arm in which said valve head moves.

5. A regulating valve comprising five parts and having a valve housing having two ducts therein, said ducts being substantially at right angles to each other and intersecting with each other, a valve seat at the point of intersection, the two ducts being separated only by the length of said valve seat, a valve head having a small cylindrical body and having its axis substantially in line with one of said ducts, and being adapted to move toward and away from said valve seat with a sliding fit to open a connection between said ducts, said valve housing at the rear end having a vertical slot therein in which the cylindrical body of the valve head is exposed, a bent float arm, a pivot in said slot on which the float arm is mounted to swing therein and engage the end of said valve head, a pin in said vertical slot adapted to limit the downward movement of said float arm and holding the valve head in its seat.

FRANK W. LAUX.